United States Patent [19]

Borja

[11] Patent Number: 4,493,467
[45] Date of Patent: Jan. 15, 1985

[54] STRAIN RELIEF
[75] Inventor: Jesus Borja, Chicago, Ill.
[73] Assignee: Illinois Tool Works, Inc., Chicago, Ill.
[21] Appl. No.: 361,656
[22] Filed: Mar. 25, 1982
[51] Int. Cl.³ .............................................. F16L 5/00
[52] U.S. Cl. .................................. 248/56; 174/153 G
[58] Field of Search ................. 248/56, 74 DB, 74 R; 174/153 G, 152 G, 65 G

[56] References Cited
U.S. PATENT DOCUMENTS

| 2,563,604 | 8/1951 | Hultgren | 174/153 |
|---|---|---|---|
| 3,464,659 | 9/1969 | Klumpp | 248/56 |
| 3,493,205 | 2/1970 | Bromberg | 248/56 |
| 3,499,097 | 3/1970 | Widstrand | 174/65 |
| 4,033,535 | 7/1977 | Moran | 174/153 G |
| 4,142,064 | 2/1979 | Thomsen | 248/56 |
| 4,216,930 | 8/1980 | Rossler | 174/153 G |

Primary Examiner—Reinaldo P. Machado
Assistant Examiner—Alvin Chin-Shue
Attorney, Agent, or Firm—Thomas W. Buckman; John P. O'Brien

[57] ABSTRACT

A one-piece plastic strain relief bushing for power line cords comprises a main body portion with a pivoted locking portion at one end thereof. The main body portion includes spaced-apart parallel walls which grip the line cord such that the line cord in the bushing is in a predetermined serpentine path. The pivoted locking portion snaps fits with an end section of the main body portion to form a slot which completely circumscribes the line cord.

2 Claims, 5 Drawing Figures

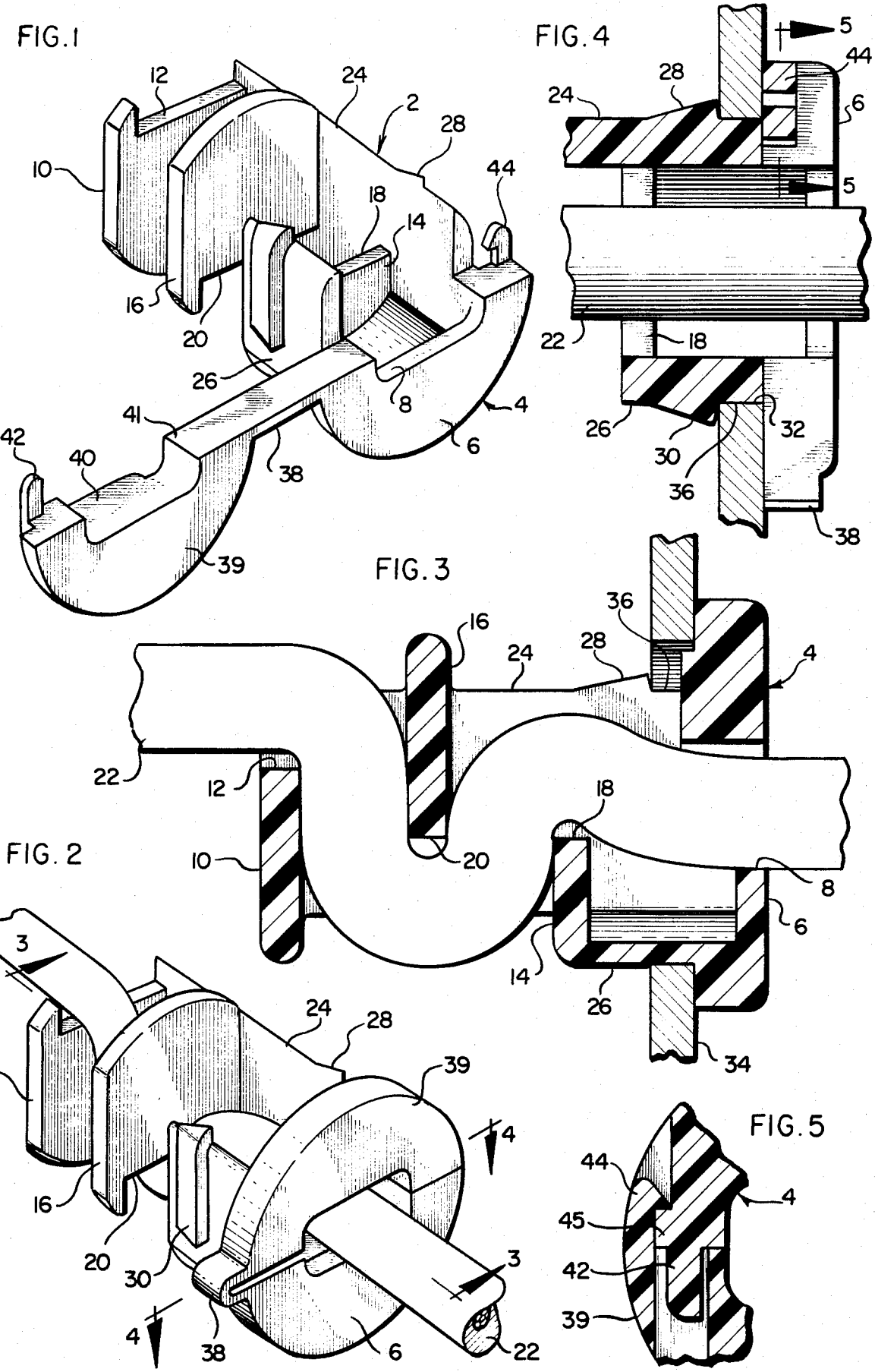

STRAIN RELIEF

BACKGROUND OF THE INVENTION

This invention relates to a strain relief and more particularly to a strain relief bushing for a power line cord. The strain relief provides a means for preventing tension forces exerted upon the power line cord of an electrical machine or appliance from being applied to the power line connections to the appliance or machine.

The electrical appliance with which the strain relief is used comprises a housing that encloses the components of the appliance and with the power line cord extending through the wall of the housing for connection to the power line source. The connection of the power line cord internally of the housing is made as sturdy as possible; nevertheless, it frequently occurs that significant tension forces will be applied to the line cord which must be taken up by the strain relief device. Prior strain reliefs have tended to be somewhat awkward in terms of assembling the line cord therewith and in assembling the strain relief with the appliance housing.

OBJECTS AND SUMMARY OF THE INVENTION

An object of this invention is to provide a strain relief bushing that may be assembled with the power line cord and inserted into a hole in the appliance housing in a quick and easy manner without the use of special tools or special skills, thereby reducing the production costs of the appliance.

A further object of this invention is to provide a strain relief of the type stated which is highly effective in resisting tension forces applied to the power line cord.

A still further object of this invention is to provide a strain relief of the type stated which is constructed of a one-piece plastic member of relatively low cost.

In accordance with the foregoing objects the invention comprises a one-piece plastic strain relief bushing having a main body portion with an end section having an end wall with a cord-receiving notch, said main body further including an additional end wall spaced from said first-mentioned end wall and having a cord-receiving notch, a pair of spaced intermediate walls between said end walls and each being parallel to said end walls, said intermediate walls each having a cord-receiving edge that is positioned relative to said cord-receiving notches such that cord-receiving edge positions of said notches and the cord-receiving edges of said intermediate walls cooperate with said walls to define a serpentine path for receiving a power line cord and serving to impart an abrupt bend in the cord and retain the cord in the bushing, and a locking portion pivoted to that main body portion at said end section, said locking portion having an edge portion adapted to overlie the first-mentioned cord-receiving slot to define therewith an opening in which said cord is positionable, said locking portion being movable from an initial position in which said edge portion is removed from said last-mentioned cord-receiving notch to a final position in which said edge portion overlies said last-mentioned notch, and means for locking said locking portion in its final position.

BRIEF DESCRIPTION OF THE FIGURES

FIG. 1 is a perspective view of a strain relief bushing constructed in accordance with and embodying the present invention and showing the bushing in its "open" position;

FIG. 2 is a perspective view of the bushing shown assembled with the power line cord;

FIG. 3 is a sectional view taken along line 3—3 of FIG. 2;

FIG. 4 is a fragmentary sectional view on an enlarged scale taken along line 4—4 of FIG. 2; and FIG. 5 is a fragmentary sectional view taken along line 5—5 of FIG. 4.

DETAILED DESCRIPTION

Referring now in more detail to the drawing, which illustrates a preferred embodiment of the invention, there is shown a strain relief bushing which is formed of a molded synthetic plastic material having high-insulating characteristics and substantial strength. Nylon is a suitable material. More particularly, the bushing comprises a main body portion 2 having an end section 4 with an end wall 6. The end wall 6 has a cord receiving notch 8. At the other end of the main body portion 2 is an additional end wall 10 having a cord-receiving notch 12. Both the notches 8 and 12 open up or face the same direction.

Between the end walls 6, 10 is a pair of spaced intermediate walls 14, 16 which are parallel to the end walls 6, 10. The end wall 14 has a cord-receiving edge 18 while the intermediate wall 16 has a cord receiving edge 20. These edges 18, 20 are presented in opposite directions and are offset from the notches 8, 10. The walls 6, 8, 14, 16 and their respective edges or notches 8, 10, 18, 20 are positioned such that a line cord 22 properly assembled with the bushing will follow a tortuous or serpentine path as best seen in FIGS. 2 and 3.

The walls 6, 8, 14, 16 are joined by an axial flange 24 which forms part of the body portion 2 and which extends substantially at right angles to the several walls 6, 10, 14, 16. The end section 4 and the intermediate wall 14 are also joined by a somewhat arcuate flange portion 26 which also forms part of the body portion 2 and which extends from the flange 24 at one side of the wall 14 to the opposite side of the wall 14.

Formed on the flange 24 is a radially outwardly projecting ramp 28. Opposite to the ramp 28 and integrally formed on the flange 26 is a second ramp 30. These ramps are tapered in the direction of the end wall 10 so that the assembled line cord and bushing can be inserted into a hole 32 in an appliance housing 34 and be snap passed the ramps 28, 30 whereby a shoulder 36 on the bushing seats against the rim of the opening 32.

A locking portion 39 is pivotally joined to the end section 4 by a thin pliable hinge strip 38. The locking portion has an edge 41 that includes a notch 40, the latter cooperating with the notch 8 to provide a slot for receiving the line cord 22 when the bushing is in the condition of FIGS. 2 and 3. The periphery of the locking portion 39 has a finger 42 that cooperates with a mating structure 44 on the end section 4 to provide a snap lock as best seen in FIG. 5. More particularly, the hooked end of the finger 42 snaps behind the enlarged base 45 of the structure 44 to retain the locking portion 39 in its final or assembled position.

When removed from the mold, the plastic strain relief is in the form shown in FIG. 1. To assemble the strain relief with the line cord 22 the cord is first folded to form a U-shape. Thereafter, the bight of the U-shape is positioned over the intermediate wall 16, which is exposed at the open side of the body portion 4 opposite to the flange 24. Then the cord 22 is partially straightened out to engage the notches 8, 10, 12 and the edges 18, 20 so as to project axially beyond the end walls 6, 10. This tends to affix the cord in the strain relief bushing. Thereafter, the locking portion 39 is moved to its final position causing the snap lock formed by elements 42, 45 to engage. Thereafter, the assembled bushing and line cords are inserted into the hole 32, end wall 10 first, and axially pushed until the bushing snaps past the ramps 28, 30 causing the end section 4 and locking portion 39 to lie exteriorly of the appliance housing and present a generally circular face.

The invention is claimed as follows:

1. A one-piece plastic strain relief bushing for a power cord line comprising a longitudinally extending main body portion having a first end wall with a cord receiving notch at one end and having an end section at the other end including a second end wall with a cord receiving notch, a pair of spaced intermediate walls being integrally formed on said main body portion between said first and second end walls in parallel relation thereto, said intermediate walls each having a cord receiving edge that is disposed relative to said cord-receiving notches of said end walls in a manner that the cord-receiving edge portions of said notches and the cord-receiving edges of said intermediate walls cooperate with said first and second end walls to define a serpentine path for receiving a power line cord in a manner to impart an abrupt bend in the cord, said end section further including a locking portion hingedly connected to said second end wall adjacent to said cord-receiving notch for displacement between opened and closed positions, said locking portion having an edge portion which overlies said second cord-receiving notch when in said closed position to thereby define an opening through which said cord is positionable, and fastening means for selectively retaining said locking portion in said closed position.

2. A strain relief bushing as defined in claim 1 in which said main body portion further includes tapered projections for retaining said bushing in an apertured supporting structure.

* * * * *